May 15, 1923.
O. L. INGRAM
DEMOUNTABLE RIM
Filed Dec. 20, 1921  3 Sheets-Sheet 1
1,455,730
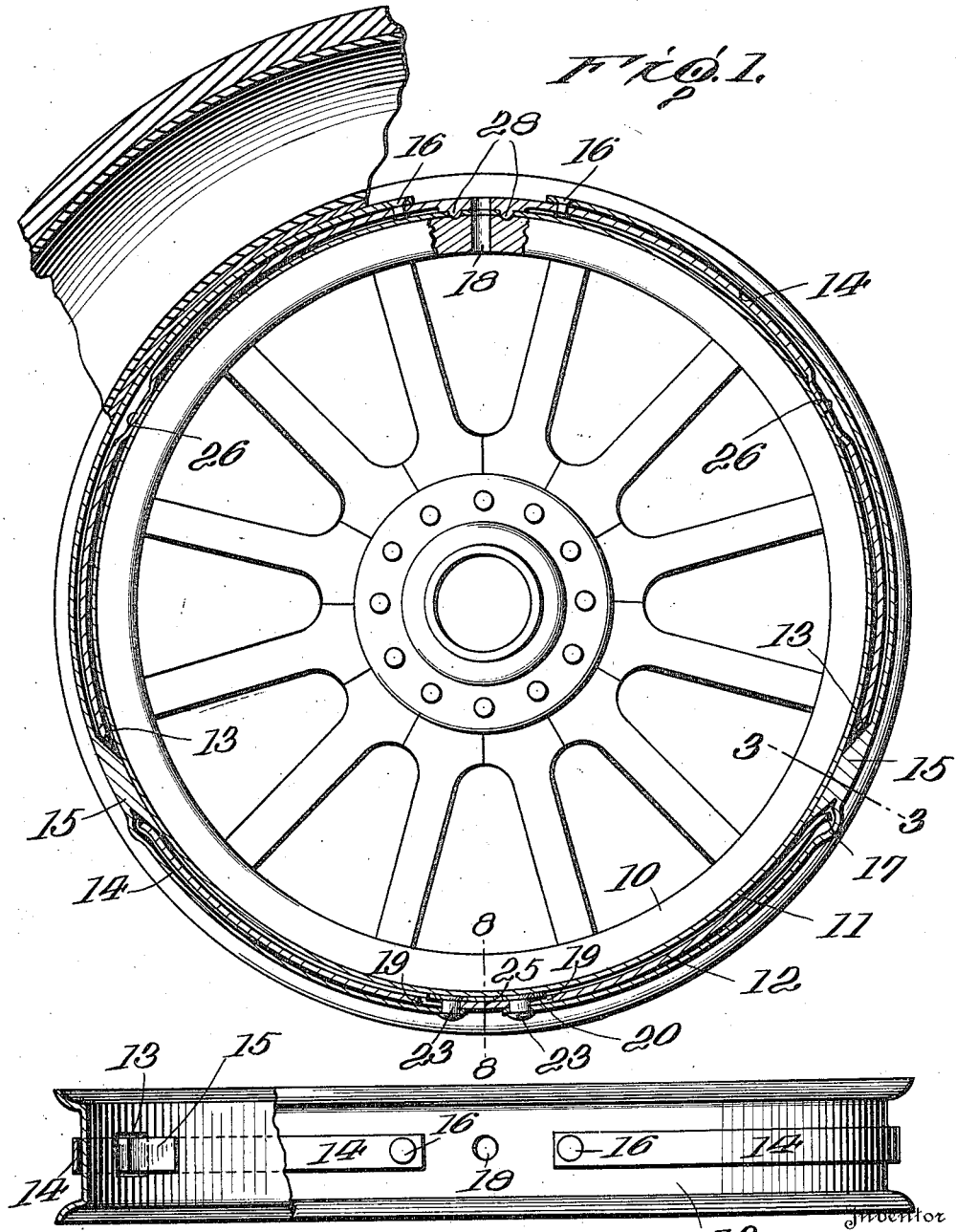

May 15, 1923.
O. L. INGRAM
1,455,730
DEMOUNTABLE RIM
Filed Dec. 20, 1921      3 Sheets-Sheet 2
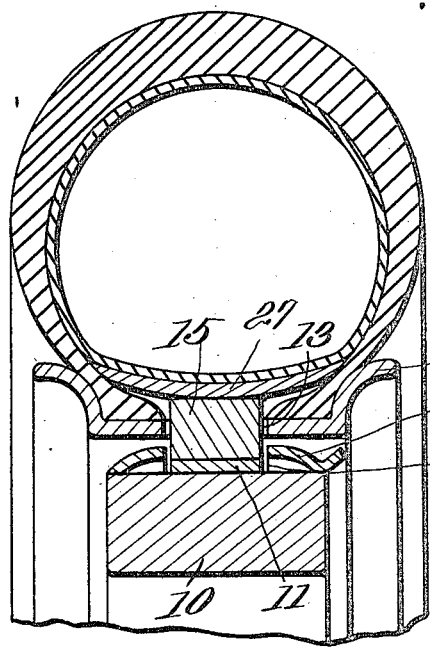
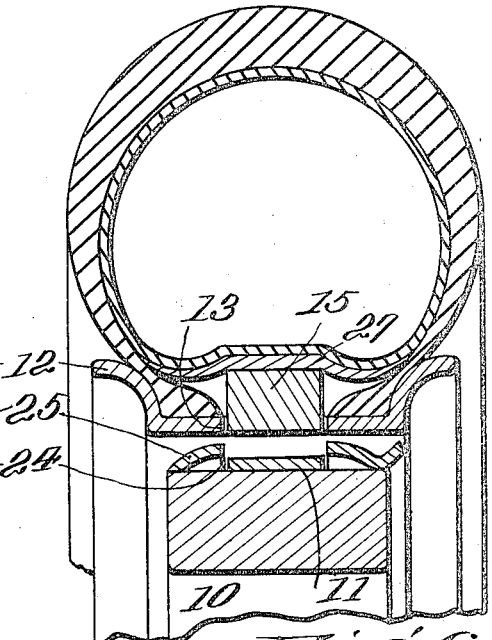
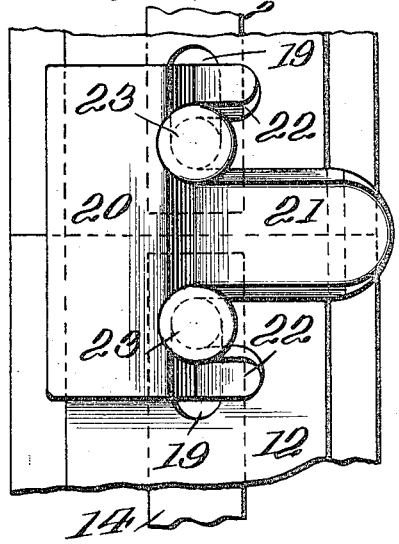
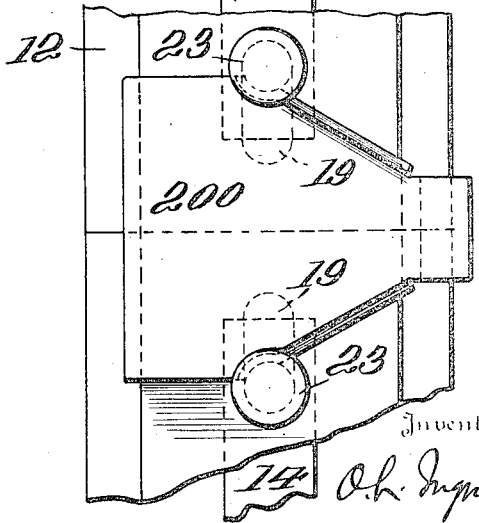

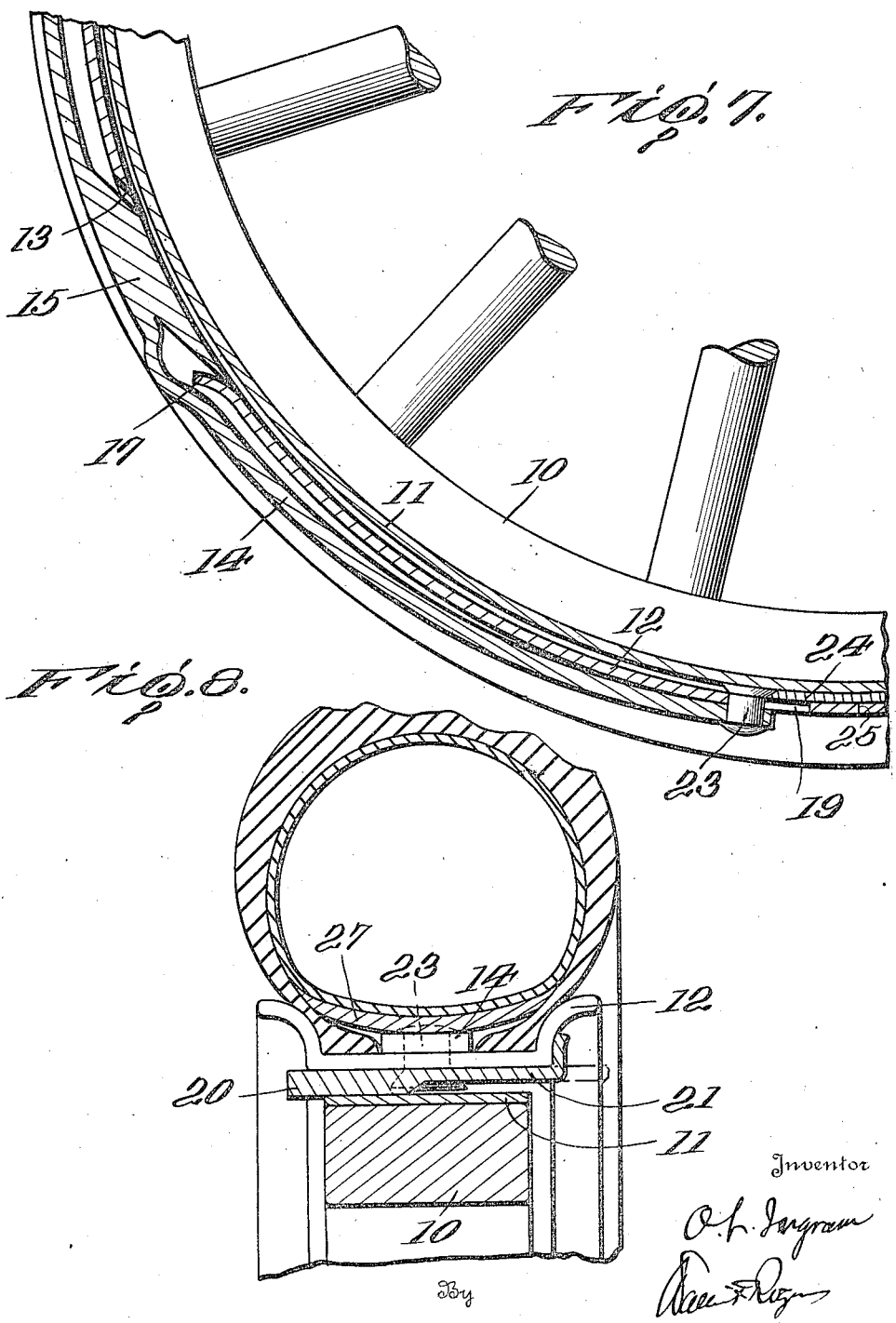

Patented May 15, 1923.

1,455,730

UNITED STATES PATENT OFFICE.

OSCAR L. INGRAM, OF WALLA WALLA, WASHINGTON.

DEMOUNTABLE RIM.

Application filed December 20, 1921. Serial No. 523,718.

*To all whom it may concern:*

Be it known that I, OSCAR L. INGRAM, a citizen of the United States, residing at Walla Walla, in the county of Walla Walla and State of Washington, have invented certain new and useful Improvements in Demountable Rims; and I do hereby declare the following to be a full, clear, and exact description of the invention, such as will enable others skilled in the art to which it appertains, to make and use the same.

My invention relates to demountable rims for vehicles, and particularly to that sort of demountable rim made use of on automobile wheels having inflatable tires.

Its object is to provide a rim that may be easily and readily removed from the wheel and easily and readily placed on the wheel while it is carrying an inflated tire.

A further object is to provide a rim of the kind mentioned that may be securely held on the wheel without the use of bolts, nuts or wedges of the type ordinarily used.

To obtain these I make use of air-driven wedges by which my rim is securely held on the wheel in true alinement. The accompanying drawings illustrate the rim and the means for securing it to a wheel.

In the drawings Fig. 1 is a sectional view, a part of the tire being shown attached to the rim, and the customary parts of the wheel being illustrated.

Fig. 2 is a plan view of my invention, partly in section for the purpose of illustrating the relation between the rim and the band segments, or arms.

Fig. 3 is a section on the line 3—3 of Fig. 1, the demountable rim being locked in place.

Fig. 4 is also a section on the line 3—3, except that in Fig. 4 the parts are shown in an unlocked position, as hereinafter described.

Fig. 5 is a plan view showing the locking key in place, acting as a wedge between the rim and the felloe band, and also holds the band segments in locking position, as hereinafter described.

Fig. 6 is a plan view showing the unlocking key in place, the pair of pins attached to the band segments being forced apart for the purpose of unlocking the rim from the wheel after the air in the tire has been discharged either accidentally or purposely.

Fig. 7 is an enlarged detail partly in section, more clearly illustrating the essential parts shown in Fig. 1, and showing a band segment and a wedge in a position to allow the rim to be removed from the wheel.

Fig. 8 is a sectional detail on the line 8—8 of Fig. 1 and showing the wedging effect of the locking key when in place, and showing the tongue of the key bent up against the side of the rim to hold it in place.

Similar numerals represent corresponding parts in the several figures.

While in the usual method of construction a rim is held on a wheel by means of various sorts of wedges held in position by bolts or nuts, which are unsightly and at times very difficult to operate properly, in my invention I use wedges which are driven to a wedging position by the pressure of the air in the inflated tire to securely lock the rim on the wheel while the tire remains inflated and yet facilitate its easy removal when the tire has become deflated. To accomplish this I provide, as shown in Fig. 1, a pair of arms or band segments 14 having wedges 15, which wedges 15 may either be a part of the band segments or may be separate wedges attached thereto by any suitable means. These wedges 15 project through holes 13 in the floor of the rim. The holes 13 each have a bent up lip 17 for the purpose of providing a wedging surface for the wedge 15, as is clearly shown in Fig. 7. The wedges 15 are adapted to engage pockets formed in or carried by the usual felloe band of the wheel. These wedges 15 are carried by the band segments 14, and may either be an integral part of the band segment or may be attached thereto in any suitable manner. As shown in Figs. 3, 4 and 8 the usual flap or projecting strip of fabric lies between the band segments 14 and the inner tube of the tire. One end of each arm segment 14 is riveted to the floor of the rim, as shown at 16, Fig. 1. The other end of each of the band segments carries a pin 23 which projects through an elongated slot 19 in the floor of the rim. (See Figs. 1, 5, 6 and 7.) The key piece 200 is adapted to be forced in between these pins 23 to force them back in the slots 19, as shown in Fig. 6. This will cause the arm segments to take the position shown in Fig. 7, and the wedges 15 will be carried back away from the wheel and into the position shown in Figs. 4 and 7. Now by reference to Figs. 4 and 7 it will readily be understood that if the tire be inflated with the parts in the position just described the pressure of the air in the tire will tend to force the arm segments and the wedges to the position shown in Figs. 1 and 3, and the wedges 15 will enter the pockets 25 and will exert a wedging effect between the rim and the felloe band as shown in Fig. 1, thus securely locking the rim on the wheel. In order to assist in holding the rim as nearly as possible concentric with the wheel I provide the supporting lugs 26, as shown in Fig. 1. These lugs or supports may be either pressed in the rim itself or may be separate pieces attached to the rim.

Now, having explained briefly the general construction of my rim I will proceed to a more detailed description of the manner of its operation when in actual use.

By reference to Fig. 2 it will be seen that in my construction a rim, to a large extent, of the ordinary shape may be used. Through this rim at the proper intervals are the holes 13, each having a bent up lip 17, as shown in Fig. 7. Around the periphery of the rim and on the floor thereof are placed the band segments or arms 14. Each of these band segments carries one or more wedges 15 which project through the holes 13 and bear against the bent up lips 17. Now assuming that the rim is not on the wheel and there is no air under pressure in the tire carried by the rim, or in other words we will suppose the tire has become "deflated", either purposely or accidentally, it being then necessary to inflate the tire and at some future time place it on the wheel, or rather, place the rim carrying the tire on a wheel. In this event the operation will now be as follows:

The first operation will be to insert the key 200 between the pins 23, as shown in Fig. 6. This is done by one or more blows with a hammer on the larger end of the key 200. This operation will cause the band segments to take the position shown in Figs. 4, 6 and 7 and the wedges 15 will be in the position shown in Figs. 4 and 7, and the parts will be firmly held in this position by the key 200. Now, and not until now, the rim is in a position to have its tire inflated. In order to prevent the inner tube from being pinched or otherwise damaged by the band segments 14 I use the ordinary protecting strip of fabric 27, as shown in Figs. 3 and 4. Now as soon as the tire is inflated the rim is ready to be placed on the wheel at any time it becomes necessary and in order to do this it is only necessary to slip it onto the wheel and strike the smaller end of the key 200 with a hammer or other convenient tool and drive it from the position shown in Fig. 6, whereupon the pressure of the air in the tire upon the arm segments 14 will immediately force them to the position shown in Figs. 1, 3 and 5, and the wedges 15 will enter the pockets 25 as shown in Figs. 1 and 3, in which position all of the parts will be firmly held by the above mentioned air pressure, and the wheel and the rim will be firmly locked together.

It will be apparent that should the air suddenly, by accident or otherwise, be discharged from the tire the band segments 14 might take the position shown in Fig. 7 and allow the rim to leave the wheel. To prevent this I provide the locking and wedging key 20 shown in Figs. 5 and 8. This key has the horns 22 and when the rim has been placed on the wheel the key 20 is driven to the position shown in Figs. 5 and 8 and the horns 22 engage the pins 23, as shown in Fig. 5, in a manner to prevent the pins 23 from moving back in the slots 19, thus effectively preventing the arm segments from leaving the position into which they have been forced by the air, even should the air thereafter leave the casing. By reference to Fig. 8 it will be seen that one end of the key 20 is thicker than the other end. The purpose of this is to allow the key 20 to act as a wedge to assist in tightening the rim on the wheel. In order to prevent the key 20 from becoming displaced accidentally the end forming the tongue 21 may be bent up against the side of the rim, as shown in Fig. 8.

Without further description it will readily be understood that in order to remove the rim from the wheel after a puncture or other accidental discharge of the air from the tire, it is only necessary to straighten out the tongue 21, remove the key 20, drive in the key 200 and lift the rim from the wheel, as the parts will then be in the unlocking position shown in Figs. 4, 6 and 7.

It will be seen by reference to Fig. 1 that the wedges 15 exert a tightening and wedging effect between the wheel and the rim, when they are in locking position, as well as exerting a positive locking effect by lying in the pockets 25, as shown in Fig. 3.

In my construction I use a pair of driving lugs 28 as shown in Fig. 1, instead of the usual single driving lug, but this has no particular bearing on my invention one way or the other. It will also be understood that it is necessary in my rim to use the so-called "split rim", and this split is shown at 25 in Fig. 7.

Now having fully described my invention, what I claim as new and desire to secure by Letters Patent, is:

1. In a wheel, the combination of an inflatable tire, a wheel body having pockets, a rim having holes, wedges adapted to pass through the holes in the rim and enter the pockets of the wheel body to secure the rim to the wheel body by the pressure of the air in the tire upon the wedges.

2. In a wheel, the combination of an inflatable tire and a rim, the rim having holes, and wedges adapted to pass through the holes and engage the wheel through the pressure of the air in the tire.

3. In a wheel, the combination of an inflatable tire and a rim, the rim having holes, the holes each having a bent-up edge, wedges adapted to pass through the holes and engage the bent-up edges of the holes and the wheel through the pressure of the air in the tire.

OSCAR L. INGRAM.